Aug. 14, 1934.  H. W. J. K. KLUGE ET AL  1,970,236
HYDRODYNAMIC POWER TRANSMISSION DEVICE
Filed July 19, 1933  4 Sheets-Sheet 1
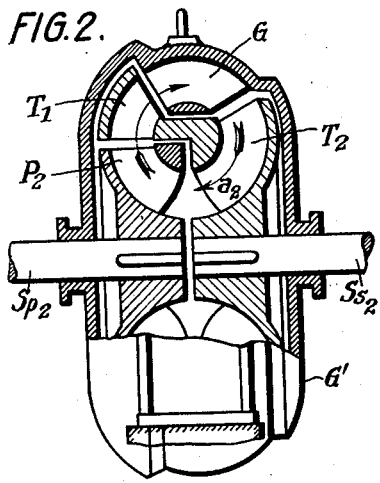
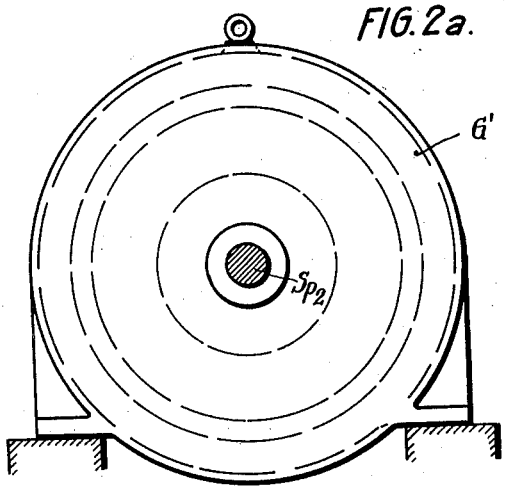
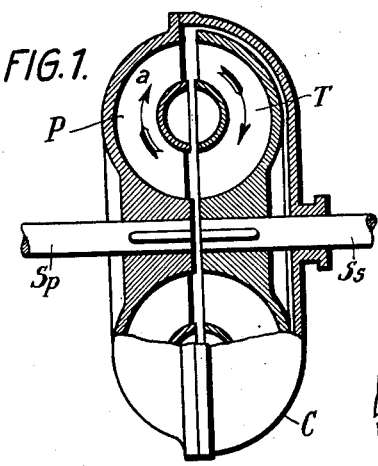
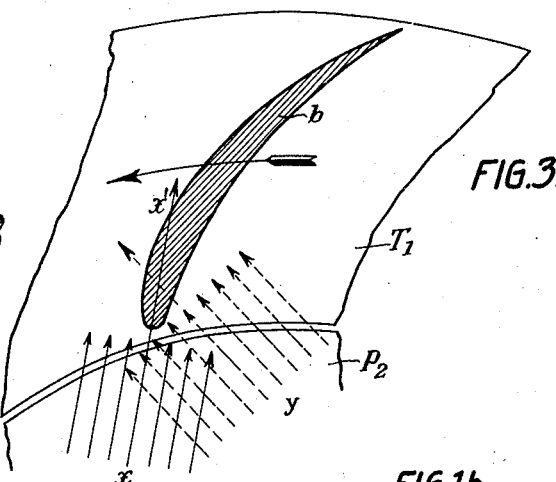
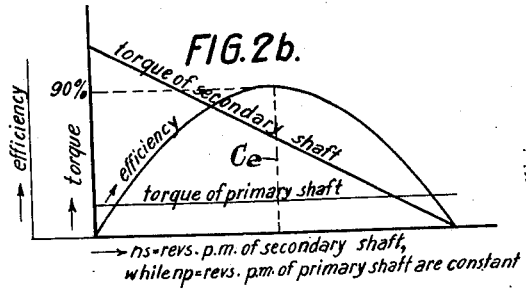
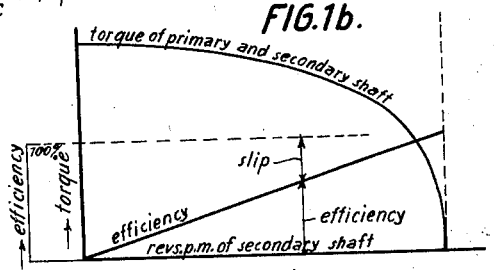
Inventors: Hans W. J. K. Kluge
and Hanns S. W. Böllinger
by Karl Viertel
Attorney

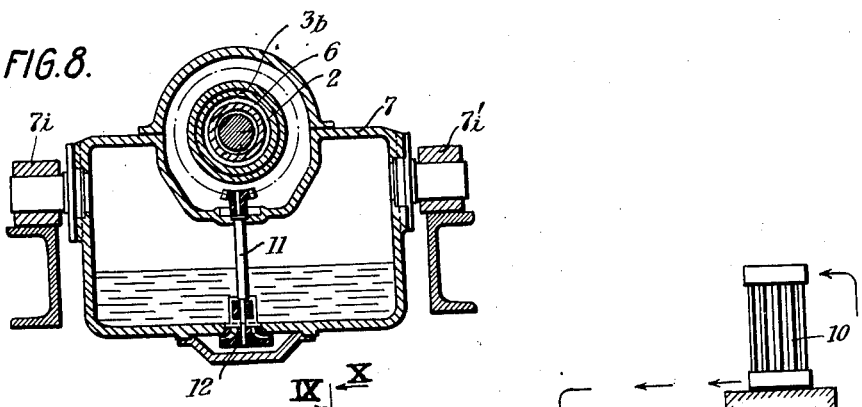
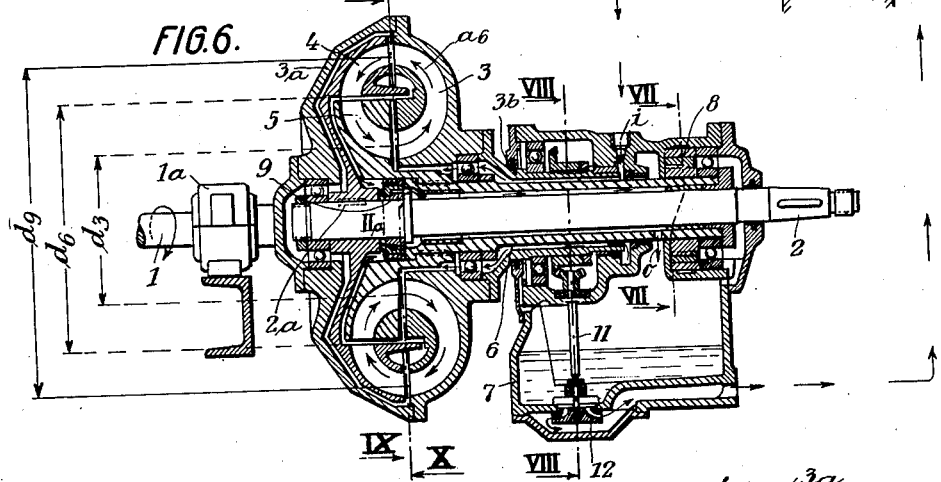
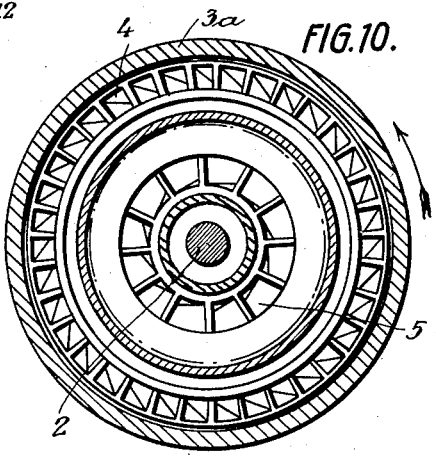

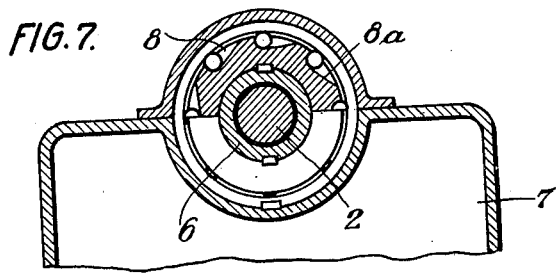
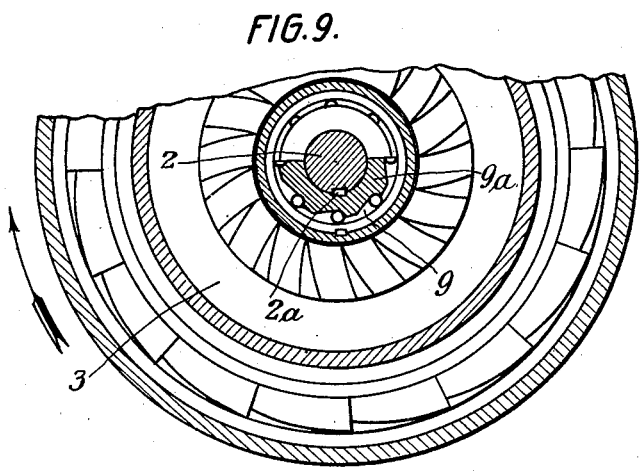
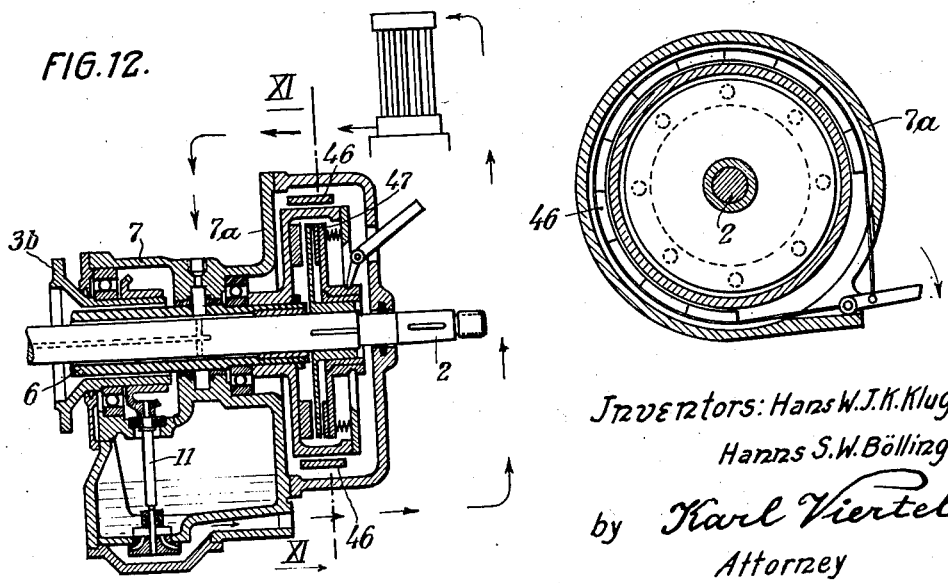

Patented Aug. 14, 1934

1,970,236

UNITED STATES PATENT OFFICE 1,970,236

HYDRODYNAMIC POWER TRANSMISSION DEVICE

Hans Wilhelm Johannes Karl Kluge, Karlsruhe, and Hanns Stephan Wilhelm Böllinger, Frankenthal, Germany Application July 19, 1933, Serial No. 681,162
In Germany August 8, 1932

6 Claims. (Cl. 60—54)

Our invention relates to the problem of transmitting mechanical power from one rotary shaft to another rotary shaft through a liquid medium, and more especially to improvements in couplings of the hydrodynamic type—as against hydrostatic power transmission—involving the flow and reaction principle, according to which by the impeller wheel of a centrifugal pump, keyed to the primary or driving shaft, the liquid medium is thrown against and forced through the bladed wheel or wheels of a turbine by which the secondary shaft is driven.

The primary object of our invention is to provide an improved hydrodynamic coupling mechanism of the type set forth which although being fitted for general application in a great many fields of engineering is particularly designed and adapted to be used in connection with motor vehicles of various types including Diesel locomotives and the like,—as a mechanism for directly interconnecting the driving shaft of the motor and the propeller shaft of the vehicle and at the same time dispensing with toothed speed changing gears and other torque converting means.

In order to render more easily comprehensible the various objects of our invention involved in the above indicated primary object and to more fully acquaint the reader with the salient features due to which said objects are attained, a brief synopsis of the structural and functional properties of the two prominent classes of hydrodynamic power transmission devices known in the art is first presented with reference to sheet 1 of the accompanying drawings in which Fig. 1 is a cross section showing diagrammatically a widely used type of hydrodynamic shaft couplings, known for instance from German Patent 238,804 of 1905 to Vulcan or United States Patent 1,199,359 (Figs. 1–7) and being hereinafter briefly called "Vulcan" coupling;—

Fig. 1b is a set of a diagrammatical lines and curves indicating significant working properties of couplings of the "Vulcan" type, Figs. 2 and 2a diagrammatically show in cross section and side elevation respectively another type of hydrodynamic shaft couplings known for instance from German Patent 221,422 of 1905 to Föttinger or said United States Patent (Fig. 8–17) and being briefly called hereinafter "Föttinger" torque converter, Fig. 2b is a set of diagrammatical lines and curves elucidating noteworthy working properties of hydrodynamic torque converters of the Föttinger type, Fig. 3 is a diagrammatic outlay showing in cross section a typical form and arrangement of a blade or vane as used in connection with the wheels of hydrodynamic power transmission devices of the aforesaid classes.

Hydrodynamic couplings of the "Vulcan" type, as shown in Fig. 1 essentially consist of a centrifugal pump having a bladed impeller wheel $P$, which is keyed to the primary or driving shaft $Sp$, and of a turbine, the bladed wheel of which is keyed to the secondary or driven shaft $Ss$ and is enclosed in a shell $C$, attached to and revolving with the centrifugal pump $P$. After the shell has been filled with a liquid, for instance oil, the coupling is ready to work: As the result of the rotation of the centrifugal pump the liquid substance circulates in the direction of arrow $a$, flowing from pump $P$ into and through the turbine $T$ thereby rotating the latter and returning into the pump.

Practitioners acquainted with the reading of diagrams will gather from the curved line in Fig. 1b indicating the torque of the primary and the secondary shaft of hydraulic couplings of the Vulcan type, and from the line indicating their mechanical efficiency under different working conditions, that Vulcan couplings give satisfactory results, i. e. show a reasonably high factor of efficiency, as long as the slip between the secondary and the primary shaft is relatively small, i. e. when the secondary shaft rotates at a velocity approximating that of the primary shaft, and that consequently no conversion of torque is obtainable from Vulcan couplings—if used alone, without additional speed changing and torque converting means such as toothed gear wheels and the like.

Hydrodynamic Vulcan couplings, because of not being capable of converting the torque of the primary shaft into a torque of higher value at the secondary shaft, cannot be used as a rule in cases where torques of greatly varying values are required at the driven shaft, such as the propeller shaft of motor vehicles in which during the accelleration period and while climbing uphills much greater torques are required than obtainable directly at the main driving shaft of the engine.

On the other hand Vulcan couplings are known to be highly efficient and appropriate power transmission means—presenting an efficiency in practice up to 98%—in cases where the torque required at the secondary shaft is substantially equal to that produced at the primary shaft, as for instance on screw propelled ships; more so because extraordinarily large kinetic energies, i. e. torques of high powered engines can be transmitted to the propeller shaft smoothly, free from shocks and vibrations of the engine, which are automatically checked in the coupling; furthermore because the coupling can be easily set into and out of operation by simply filling into or withdrawing from the coupling the liquid medium by a pump; and—last but not least—because Vulcan couplings due to their structural simplicity are very reliable i. e. are for extremely long working periods safe against getting out of commission, as compared with friction couplings and like shaft engaging and disengaging gears which require from time to time overhauling, relining, etc.

On account of these valuable properties hydrodynamic Vulcan couplings have been chosen, in some exceptional cases as power transmission means in motor vehicles, viz. Diesel locomotives, although the latter had to be provided with oversize oil engines, uneconomical as to their fuel consumption, the torque at the main driving shaft of which being powerful enough for starting the train and for climbing, i. e. considerably larger than required for the average load, while the train is running at normal speed and on horizontal sections of the track.

The other class of hydrodynamic power transmission devices, to be dealt with in this introductory synopsis, comprises torque converters of the Föttinger type, referred to above with reference to Figs. 2, 2a and 3: Föttinger converters essentially consist of a centrifugal pump, the bladed impeller wheel P2 of which is keyed to the primary shaft $Sp2$, of a turbine which may be the two-stage type, the bladed wheels T1 and T2 of which are keyed to the secondary shaft $Ss2$ and of a non-rotatable bladed guide rim G arranged between the turbine wheels T1 and T2 within a stationary shell G' which encloses from all sides the pump and the turbine and supports both rotary shafts. On setting to work the primary shaft $Sp2$ and filling the shell with a liquid medium the latter will circulate in the direction of the arrow $a2$, flowing from the pump into and through the turbine thereby revolving the latter, passing meanwhile through guide rim G, and returning into the pump P2.

The characteristic property and capability of this hydraulic power transmitting gear of converting the torque of the primary shaft into a greater torque at the secondary shaft is due to the function of the stationary element, the bladed guide rim, which takes up the difference between both torques and insures the equilibrium of rotary forces.

The cross sectional form and arrangement of the blades in the wheels and the guide rim of the Föttinger torque converters are so chosen with regard to the individual normal rotary speed of the primary and of the secondary shaft for which any individual specimen of converter is designed that the streaming direction—see arrow $x$ in Fig. 3—of the liquid on passing out of any section, for instance impeller wheel P2, and entering the next following section, turbine wheel T1, will substantially coincide with the axis of symmetry at the front edge of the blade $b$ of the said next following section,—as indicated by arrow $x'$—with the object of causing the liquid to enter each section practically without impact loss.

This will be better understood by taking in view for the sake of comparison an irregular working condition, according to which the liquid would enter say in the direction of arrow $y$, indicated in Fig. 3 in dotted lines: In that case energy would be lost through the impact of the liquid against the blades $b$, resulting in eddying and the conversion of mechanical energy into heat.

This means that impact losses are only avoided and that torque converters of the Föttinger type will work best with a specific ratio of gearing for which its bladework is designed and constructed, viz. fixed by "construction." For instance if the "construction"-ratio of gearing of the torque converter is 1:3, the maximum efficiency is obtained under working conditions, which may be appropriately termed "normal", when the driving shaft makes 3 revolutions to one revolution of the driven shaft. Under those normal conditions efficiency factors exceeding 90% are obtainable in practice, whereas under abnormal working conditions the efficiency factor gradually decreases and eventually goes down to zero.

The principal working characteristics of Föttinger torque converters are illustrated in Fig. 2b in which the parabolic diagram line indicates the growth of the efficiency factor, as ascertained by actual braking tests, taken under steady working conditions at the primary shaft of the converter, viz. while the rotary speed (number of revolutions) of the primary shaft is constant ($np$=constant):

As long as the secondary shaft rotates at a speed, corresponding to the normal ratio of gearing, fixed by "construction" (for instance 1:3), referred to above, the maximum efficiency is obtained indicated by a dotted line $Ce$, whereas, whenever the rotary speed of the secondary shaft deviates from the "construction" rate of speed by gaining or losing the efficiency drops and goes eventually down to zero in both cases, viz. when the secondary shaft is arrested, i. e. stopped from rotating for instance by brakes ($ns$=0) and when the secondary shaft attains a speed largely exceeding the normal "construction"-speed.

Summarizing the result of our above described investigations the parabolic diagram line indicating the growth of the efficiency shows that good results and fairly good results are obtainable with power transmission gears of the Föttinger torque converter type only while the secondary shaft rotates at a predetermined "construction"-speed or keeps within limited ranges of speed at the right and left side of the dotted line $Ce$.

Our research work laid down in diagram lines (Fig. 2b) further shows that power transmission devices of the Föttinger torque converter type—although being capable of automatically responding to and adjusting themselves within certain limits to varying loads and producing a conspicuously high torque for starting and accelerating the secondary shaft under load—cannot be used in motor driven vehicles, except jointly with mechanical coupling means and speed changing gears.

Our experiments have shown that the secondary shaft in gaining speed in practice never reaches at all the speed of the motor shaft but only a certain maximum which is always considerably below the rotary speed of the motor shaft.

A good many hydrodynamic power transmission devices of Vulcan and Föttinger types are known in the art which have been adapted on account of their highly desirable functional properties referred to above for utilization in motor vehicles and have been structurally combined with mechanical devices such as friction clutches, so as to be fitted for directly interconnecting the motor and the propeller shaft, viz. while the vehicle runs at full speed, as proposed for instance in United States Patent 1,298,990 to Mason—and (or) with toothed speed changing gears for temporarily converting the torque at the secondary shaft.

However by the application of friction clutches, toothed speed changing gears etc. jointly with hydraulic power transmission devices the predominant and most valuable properties inherent to the latter, their structural simplicity, reliability of working and safety against getting out of commission are lost.

In contradistinction thereto our invention aims at providing a highly efficient, purely hydrodynamic power transmission device of improved design, primarily fitted for utilization in motor driven vehicles and being adapted to alternately act as torque converter of the Föttinger type as required in starting, climbing etc.—and as an hydraulic coupling of the Vulcan type while the vehicle runs at high speed, under small load etc., thus exhibiting in one and the same device combined the desirable features characteristic of the Föttinger torque converter and the Vulcan coupling referred to in detail hereinbefore.

In connection therewith our invention aims at providing an automatic hydrodynamic power transmission device of improved design, by which the manual cooperation of the driver of the motor vehicle besides for steering is solely required for controlling the fuel supply to the motor and attending to the brakes.

Another object of the invention is to thus design the improved hydrodynamic power transmission device that a constant flow of rotary driving force from the motor to the propeller shaft is maintained viz. with no interruption, while the device changes its manner of working.

Other objects of the invention will become incidentally apparent hereinafter to those skilled in this art.

The nature and scope of our invention are briefly outlined in the appended claims and will be more fully understood from the following specification taken together with the accompanying drawings in which Fig. 4 is a fragmentary longitudinal section diagrammatically showing a hydrodynamic power transmission device which embodies the salient ideas of our invention.

Fig. 6 shows in a smaller scale a structurally modified embodiment of the invention in longitudinal section;

Fig. 7 is a cross section, taken along line VII—VII and being seen from the left hand side in the direction of the arrows in Fig. 6;

Fig. 8 is a cross section, taken along line VIII—VIII and being seen from the left hand side in the direction of the arrows in Fig. 6;

Figs. 9 and 10 are cross sections taken along lines IX—IX and X—X and being seen from the left and right hand sides respectively in the direction of the arrows in Fig. 6.

Figures 11—12 show in cross section and by way of an example hand operated means for alternately interlocking the auxiliary wheel with the stationary member and the secondary shaft.

Figure 4:
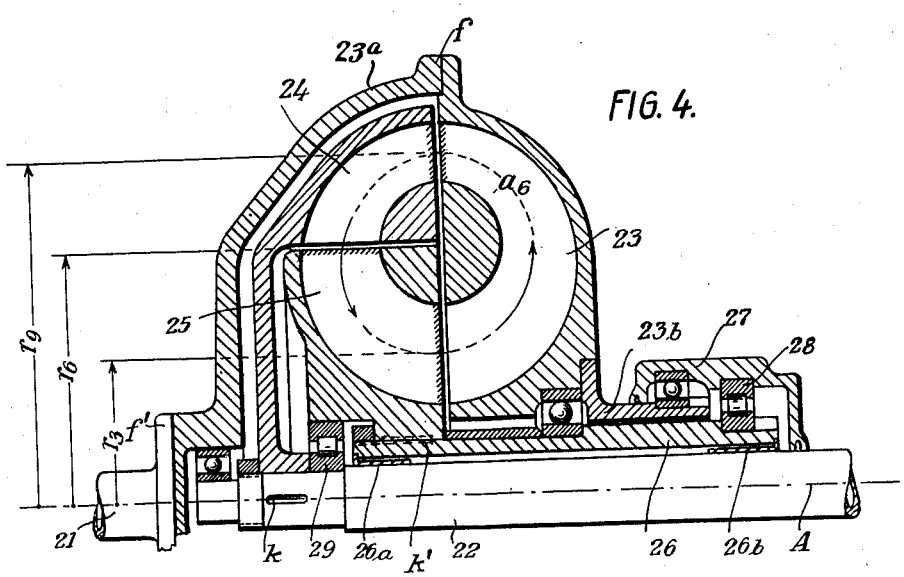

Referring to the embodiment of the invention, shown in Fig. 4 the hydrodynamic power transmission device essentially consists of a pump wheel 23 having blades or vanes (not shown) and being flanged at $f$, $f'$ by means of a shell $23a$ to the driving shaft 21 of the motor, which rotates say in clockwise direction as seen from the motor, a bladed turbine wheel 24 designed to rotate in anti-clockwise direction and being keyed at $k$ to the driven shaft 22, an auxiliary bladed wheel 25, keyed at $k'$ to a hollow sleeve 26, which is spaced by means of bushes $26a$, $26b$ from shaft 22 and is freely rotatable on the latter, and a stationary casing 27 which supports the secondary shaft 22 and encloses the rear end of said sleeve 26 and a collar $23b$ projecting from the pump wheel 23.

A coupling mechanism of the roller and incline slot type 28 is provided for automatically interlocking the stationary casing 27 and sleeve 26, so as to arrest the said auxiliary wheel 25 under specific working conditions, when the latter endeavors to rotate in clockwise direction; another coupling mechanism 29 of the roller and incline slot type is provided for automatically interlocking the secondary shaft 22 and the auxiliary wheel 25 under working conditions, when the latter, on rotating in anti-clockwise direction, endeavors to overtake the secondary shaft 22.

One of the salient features of our invention lies in the fact that the bladed auxiliary wheel 25 is so designed and cooperatively associated with the turbine 24, the pump 23 and the secondary shaft 22, as to be capable of alternately performing the duty of a stationary guide rim, like that in the Föttinger torque converter, (G in Fig. 2) and acting as an auxiliary turbine of the radial inward flow or centripetal type, adapted to assist in the work of the main turbine 24 and thus to enhance the efficiency of the device.

With this object in view the bladed rim of the auxiliary wheel 25 is arranged in a section of the fluid circuit $a6$ which is directed towards and located adjacent to the longitudinal axis of symmetry A of the device, viz. the radial distance $r6$ of the fluid intake of the auxiliary wheel 25 being considerably longer than the radial distance $r3$ of its fluid exit from the longitudinal axis A; in other words the exit should preferably be in or close to the innermost section of the fluid circuit $a6$ relatively to the axis A.

Another imporant feature of our invention is the arrangement of the pump 23, the turbine 24 and the auxiliary wheel 25 in such sequence that the circulating fluid will pass from the pump first into the turbine and thence into the auxiliary wheel 25, the transit of the fluid from the pump 23 into the turbine 24, indicated by hatched lines, being preferably in a section of the fluid circuit $a6$ the middle radial distance $r9$ of which from the longitudinal main axis of symmetry A is about the greatest possible.

In Figs. 6—10 a hydrodynamic power transmission device designed according to this invention is shown with all essential structural details by way of an example:

There is also one single closed fluid circuit $a6$ within which the working fluid circulates in the direction of the arrows and which comprises a bladed pump or impeller wheel 3, the blades of which being seen in Fig. 9,—a bladed turbine wheel 4 and a bladed auxiliary wheel 5, the blades of which are seen in Fig. 10.

The pump wheel 3 having a collar 3b at its rear side is cooperatively connected through a shell 3a with the driving shaft 1 which rotates in the direction of the arrow in a bearing 1a, supporting the rotary part of the transmission device. The turbine wheel 4 is keyed at 2a to the secondary shaft 2 which is supported by a number of ball bearings within the rotary and the stationary section of the device.

The auxiliary wheel 5 is keyed to a sleeve 6 extending through the stationary casing 7 which is supported by bearings 7i, 7i' and pivots crosswisely extending from the casing 7.

A self-locking and unlocking mechanism of the roller and incline slot type 8, 8a (Fig. 7) is provided between the sleeve 6 and the casing 7, so designed that the auxiliary wheel 5 is automatically interlocked with the casing 7, so as to act periodically as a stationary guide wheel in the manner of the Föttinger torque converter.

Another self-locking and unlocking mechanism 9, 9a of the roller and incline slot type is arranged between the secondary shaft 2 and the hub of the auxiliary wheel 5 (Figs. 6 and 9), so designed that the latter is automatically coupled with the secondary shaft 2 under working conditions, when the auxiliary wheel is to act as a centripetal turbine rotating in clockwise direction and endeavoring to overtake shaft 2.

With this object in view the auxiliary wheel 5 is so designed that its diameter $d6$ at the fluid intake is considerably larger than its middle diameter $d3$ at the exit of the fluid, the exit being preferably in a section of the fluid circuit $a6$ which is located closely to the shaft 2; while the annular zone of transit, indicated in Fig. 6 by its middle diameter $d9$, where the fluid passes from the pump 3 into the turbine 4, is located in a section of the fluid circuit $a6$ which is preferably the farthest possible from the rotary shaft 2.

Various changes and modifications may be made in the structural details of hydrodynamic power transmission devices of the improved design described above and in the cooperative association of their component parts, without substantially departing from the spirit and the leading ideas of our invention, and without sacrificing any advantages obtained thereby.

For instance the stationary casing 7 may be provided with an automatic liquid feeding and circulating device such as a centrifugal pump 12, the impeller shaft 11 of which is driven through bevel gear wheels, cooperatively connected with collar 3b of the pump wheel 3. The liquid issuing from the pump 12 circulates through a cooler 10 and thence through the whole power transmission device, including the fluid circuit $a6$, as indicated by the various arrows, entering thereinto at $i$ and returning at $o$ into the casing 7, thus keeping the fluid within circuit $a6$ cool and under constant pressure and preventing the formation of hollow spaces which would interfere with the proper working and would impair the efficiency of the device.

Instead of providing automatic means 8, 8a, 9, 9a for alternately interlocking for the purposes set forth the auxiliary wheel 5 with the stationary member and the secondary shaft, hand operated engaging and disengaging means may be used to advantage. As seen in Figures 11 and 12 showing a modified construction a band brake 46 may be arranged in a brake drum 7a of the stationary casing 7 for stopping the rotary motion of the auxiliary wheel 5 and a friction clutch 47 for coupling by hand the auxiliary wheel 5 and the secondary shaft 2.

Figure 5:
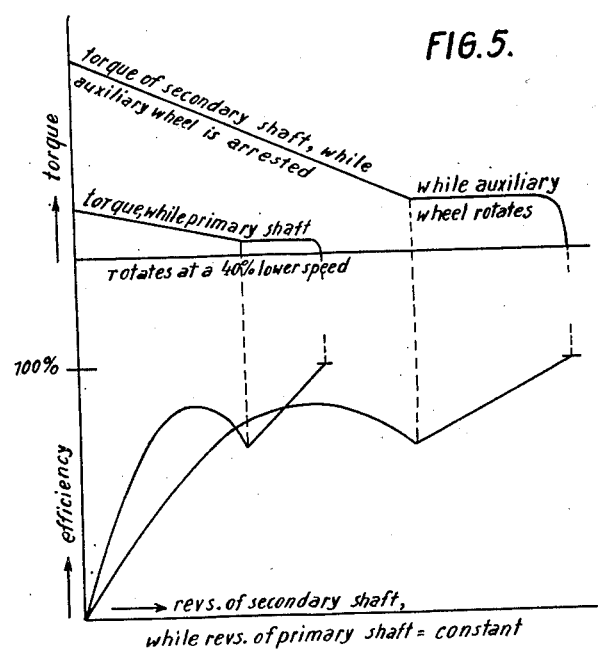
Fig. 5 is a set of diagram lines showing the principal working properties inherent to hydrodynamic power transmission devices designed according to this invention, viz. change of torque occurring at the secondary shaft and the efficiency factor in their relation to changes of the rotary speed of the secondary shaft and to steady working conditions at the primary shaft ($np=$ constant)

The two diagram lines seen in Fig. 5 which indicate the course of the efficiency factor were obtained in the course of practical braking tests, to which power transmission devices, designed according to this invention, were subjected.

It will be noted that the efficiency lines, which resemble each other in their form and are composed of substantially parabolic and rectilinear sections, exhibit the desirable features characteristic of the Föttinger torque converter and the Vulcan coupling combined, showing that the improved device can be used to special advantage in connection with vehicles driven by internal combustion motors and with various other motor operated appliances, including hoisting machines, excavators etc., wherein torques greatly exceeding that directly available at the motor shaft proper are required at the secondary shaft for starting, accelerating and climbing, and wherein at the same time great economy, i. e., efficiency, is wanted under normal conditions, while the vehicle runs at full speed and no conversion of torque is needed.

What we claim is:

1. A hydrodynamic power transmission device of the type set forth, comprising a rotary casing, the latter enclosing a single ring shaped fluid circuit, and a stationary casing cooperatively associated with the rotary casing, a driving shaft, the rotary casing comprising a bladed pump wheel for connection with the driving shaft, a driven shaft, a bladed turbine wheel for connection with the driven shaft and a bladed auxiliary wheel so associated with the stationary casing and the driven shaft, as to be capable of alternately acting as a stationary guide rim for torque conversion or as a turbine of the radial inward flow or centripetal type for assisting the work of the driven shaft, locking means being provided for changing the cooperation of the said auxiliary wheel in response to variations of the load, namely, for interlocking the said wheel either with the stationary casing or with the driven shaft.

2. A hydrodynamic power transmission device of the type set forth and having the features outlined in claim 1, in which the bladed rim of the said auxiliary wheel is arranged in a section of the fluid circuit which is directed towards and located adjacent to the longitudinal main axis of symmetry of the device, the fluid intake of the auxiliary wheel being considerably farther away from the said axis of symmetry than the fluid exit.

3. A hydrodynamic power transmission of the type set forth and having the features outlined in claim 1, in which the pump—, turbine—, and auxiliary wheels are arranged in such sequence with regard to the circulating fluid, that the latter will pass from the pump first into the turbine and thence into the auxiliary wheel, the transit of the fluid from the pump into the turbine being arranged in a section of the fluid circuit which is about the farthest possible from the longitudinal main axis of symmetry of the device.

4. A hydrodynamic power transmission device of the type set forth and having the features outlined in claim 1, in which the said locking means comprise two automatic couplings, one of them being arranged intermediate the auxiliary wheel and the stationary casing, the other one being arranged intermediate the auxiliary wheel and the driven shaft.

5. A hydrodynamic power transmission device of the type set forth and having the features outlined in claim 1, in which the said locking means comprise two automatic couplings of the roller and incline slot type, a hollow sleeve on which the auxiliary wheel is mounted, one of the couplings being arranged intermediate the hollow sleeve and the stationary casing, the other one being arranged intermediate the hub of the auxiliary wheel and the driven shaft.

6. A hydrodynamic power transmission device of the type set forth and having the features outlined in claim 1, the stationary casing of which is supported by pivots, cross-wisely extending therefrom.

HANS WILHELM JOHANNES KARL KLUGE.
HANNS STEPHAN WILHELM BÖLLINGER.